United States Patent [19]
Chang

[11] Patent Number: 5,576,880
[45] Date of Patent: Nov. 19, 1996

[54] ACOUSTO-OPTIC BRAGG CELL

[75] Inventor: I-Cheng Chang, Sunnyvale, Calif.

[73] Assignee: Aurora Photonics, Inc., Santa Clara, Calif.

[21] Appl. No.: 220,746

[22] Filed: Mar. 31, 1994

[51] Int. Cl.[6] .................................................. G02F 1/33
[52] U.S. Cl. .............................. 359/305; 359/311; 385/7
[58] Field of Search .................................. 359/305, 308, 359/311, 285; 385/1, 7; 372/13

[56] References Cited

U.S. PATENT DOCUMENTS

| 4,394,060 | 7/1983 | Verber et al. | 350/96.13 |
| 4,671,620 | 6/1987 | Yao | 350/358 |

OTHER PUBLICATIONS

A. Korpel et al, "A Television Display Using Acoustic Deflection and Modulation of Light", Appl. Optics 5 p. 1667, Oct., 1966.
E. I. Gordon, "A Review of Acousto–Optical Deflection and Modulation Devices", Appl. Optics 5 p. 325, Oct. 1966.
I. C. Chang, "Birefringent Phased Array Bragg Cell", IEEE Ultrasonic Proceedings, p. 381.
E. Young et al, "Generalized Phased Array Bragg Interaction in an Anistropic Crystal" SPIE vol. 1476 (1991).
I. C. Chang, "Noncollinear Acousto–Optic Filter with Large Angular Aperture", Applied Phys. Letts. 35 p. 370, Oct. 15, 1974.
L. T. Nguyen & C. S. Tsais "Efficient Wideband Guided-Wave Acoustoptic Bragg Diffraction Using Phased Array . . . ", Appl. Optics 16 p. 1297, May, 1977.
I. C. Chang, "Acousto–Optic Modulator with Wide Bandwidth and Large Angular Aperture", Elec. Lett. 30 p. 1190, Jul., 1994.

Primary Examiner—Georgia Y. Epps
Assistant Examiner—Dawn-Marie Bey

[57] ABSTRACT

An acousto-optic modulator utilizing light diffraction by phased acoustic waves in a birefringent crystal. The wavevector of the resultant acoustic wave is selected so that the tangents to the loci of the wavevectors of the incident and diffracted light are parallel. This provides a large acceptance angle for the acousto-optic modulator. By simultaneously choosing the acoustic wavevector to be tangential to the locus of the diffracted light wavevector, the acousto-optic modulator also achieves increased modulation bandwidth.

11 Claims, 2 Drawing Sheets

ACOUSTO-OPTIC BRAGG CELL

BACKGROUND OF THE INVENTION

1. Field of the Invention

The present invention relates to an acousto-optic device which may be utilized for modulating, switching and scanning laser beams.

2. Description of Prior Art

There are available in the prior art acousto-optic (AO) devices that operate based on the diffraction of light by acoustic waves. The device, generally referred to as the AO Bragg cell, comprises an optically transparent medium onto which piezoelectric transducers are bonded. The transducer converts an input RF into a traveling acoustic wave in the medium. By varying the frequency and amplitude of the RF signal, the AO Bragg cell can be used to deflect and modulate an optical beam.

As an optical deflector, the AO Bragg cell scans an incoming laser beam into a range of angular positions or spots according to the frequency of the RF signal. In order to achieve large number of resolvable spots, the incident laser beam must be well-collimated with small angular divergence. The resolution or maximum number of resolvable spots of an AO deflector N is equal to the product of the frequency bandwidth $\Delta f$ and time aperture $\tau$, i.e., $N=\Delta f \tau$. The primary objective in the design of the AO deflector is to maximize bandwidth, $\Delta f$ and time aperture, $\tau$.

The bandwidth of an AO deflector is the frequency range for efficient light diffraction and is a measure of the deflector speed. One technique of increasing the bandwidth of the deflector is based on AO diffraction in a birefringent crystal. By choosing acoustic wavevector to be tangential to the locus of the diffracted light wavevector efficient AO diffraction is obtainable for a wide range of acoustic frequencies. This method of increasing deflector bandwidth is referred to as tangential phase matching (TPM). Birefringent deflectors operated at TPM is disclosed in a paper entitled, "Continuous Deflection of Laser Beams" appearing on pages 48–51 in the January, 1967 issue of Applied Physics Letters.

An alternative technique for increasing the bandwidth of AO deflector is the use of acoustic beam steering with a phased array of transducers. The simplest phased array employs fixed phase difference of 180 degrees between alternate transducer elements in a planar configuration. By selecting a proper inter-element spacing the acoustic beam can be steered to track the phase matching condition over a larger frequency range, thereby increasing the bandwidth of the AO deflector. From the wavevector construction, the acoustic wavevector is shown to be tangential to the locus of the diffracted light vector. Thus, by using phased array transducers, it is possible to realize the TPM condition. For isotropic AO diffraction, the inter-element spacing s of the phased array must be equal to the characteristic length $L_o = n\Lambda_o^2/\lambda_o$ where n is the refractive index, $\Lambda_o$ is the acoustic wavelength at center frequency and $\lambda_o$ is the optical wavelength.

The planar transducer array has two radiation lobes, thus half of the acoustic power is wasted. A more efficient use of the acoustic power has been demonstrated using a stepped phased array where the height of each step in the phased array is equal to $\Lambda_1/2$. The phased array is blazed so that the beam steering angle from the transducer plane is zero at the reference acoustic wavelength $\Lambda_1$. This results in a single lobe and an accompanying increase in efficiency. Wideband AO deflectors using planar and stepped phased arrays were described in an article by Korpel et al entitled, "A Television Display Using Acoustic Deflection and Modulation of Coherent Light" appearing on pages 1667–1675 in the October 1967 issue of Applied Optics, and another article by E. I. Gordon entitled, "A Review of Acousto-Optical Deflection and Modulation of Coherent Light" appearing on pages 325–335 of the same issue of Applied Optics. The stepped array AO deflector was also disclosed in U.S. Pat. No. 3,493,759. Since the stepped phased array transducers are difficult to implement in practice, simpler fabrication techniques have been proposed. These are disclosed in U.S. Pat. No. 4,381,887, entitled, "Simplified Acousto-Optic Deflector using Electronic Delays," and U.S. Pat. No. 4,671,620, entitled, "Phased-Array Acousto-Optic Bragg Cell".

It is possible to achieve tangential phase matching by combining phased array transducers and birefringent diffraction. The net effect is to shift the acoustic frequency for tangential phase matching. The phased array birefringent deflector is described in the following articles: "Birefringent Phased Array Bragg Cells," 1985 IEEE Ultrasonics Symposium Proceedings, pages 381–384 and "Generalized Phased Array Bragg Interaction in Anisotropic Crystals," 1991 Proceedings of SPIE, Vol. 1476, pages 178–179.

The time aperture of an AO deflector is equal to the acoustic transit time across the optical aperture. In some efficient AO materials such as $TeO_2$, the acoustic propagation is highly anisotropic. The acoustic energy flow is along the group velocity direction and is in general noncollinear with the acoustic phase velocity direction. The acoustic energy walks off from the acoustic wavevector and thus the maximum time aperture obtainable is limited.

To realize a large deflector resolution, it is desireable to realize a wide bandwidth, meanwhile overcoming the limitation of time aperture.

The AO Bragg cell can also act as a laser beam modulator that provides amplitude or phase modulations. In this case, a large temporal modulation bandwidth is desired. In the case of collimated incident beam, an AO modulator can realize a large frequency bandwidth by operating at TPM condition. However, the spectral components of the diffracted light is spread over a range of angular directions and will not mix collinearly at the detector to realize the desired modulation bandwidth. In the reverse case of focused beam optics, light diffraction is inefficient since the phase matching condition will be satisfied only for a narrow range of incident light directions. Thus, the AO modulator requires large input and large output angular bandwidths. Until now it has not been possible to satisfy this dual requirement.

It is possible to obtain large angular aperture by utilizing birefringent AO diffractions. The acoustic wavevector in a birefringent diffraction is properly chosen so that the tangents to the loci of incident and diffracted light wavevectors are substantially parallel. The phase matching becomes relatively insensitive to the direction of incident light, a condition known as non-critical phase matching (NPM). However, this type of interaction geometry generally results in narrow bandwidth and has been used in another type of AO device known as the acousto-optic tunable filter, for filtering of light. The type of AOTF operated at NPM condition is disclosed in an article entitled "Noncollinear Acousto-Optic Filter with Large Angular Aperture," appearing on pages 370–372 of the Oct. 15, 1974 issue of *Applied Physics Letters* (Vol. 25), and in U.S. Pat. No. 4,052,121 entitled "Noncollinear Tunable Acousto-Optic Filter."

Recent development of AO devices has been focused on integrated optic or guided wave structure, i.e., the interaction between surface acoustic waves (SAW) and guided optical waves. The use of phased array transducer for increasing the bandwidth of the guided wave AO deflector has been discussed in an article entitled, "Efficient Wideband Guided-Wave Acousto-Optic Bragg Diffraction Using Phased-Surface Array in $LiNbO_3$ Waveguide," Appl. Opt., Vol. 16, pp. 1297–1304, May, 1977. A different method using two titled SAW transducers in a guided wave AO deflector is described in U.S. Pat. No. 4,027,946, entitled, "Acousto-Optic Guided Light Beam Device." Since the fractional bandwidth of a SAW transducer is small, the use of two transducer of staggered frequencies provides the AO deflector with a wider acoustic bandwidth.

SUMMARY OF THE INVENTION

The present invention provides preferred configurations of AO Bragg cell using phased array acoustic transducers. One object of the present invention is to provide a preferred configuration of an AO modulator with large angular aperture.

Another object of the present invention is to provide a preferred configuration of an AO modulator with wide bandwidth and large angular aperture.

It is also an object of the present invention to provide a preferred embodiment of a wideband AO frequency shifter.

It is another object of the present invention to provide a preferred configuration of an AO deflector with wide bandwidth and high resolution.

It is further the object of the present invention to provide a AO Bragg cell with wide angular aperture using guided wave AO interaction.

DESCRIPTION OF THE PREFERRED EMBODIMENT

Figure 1:
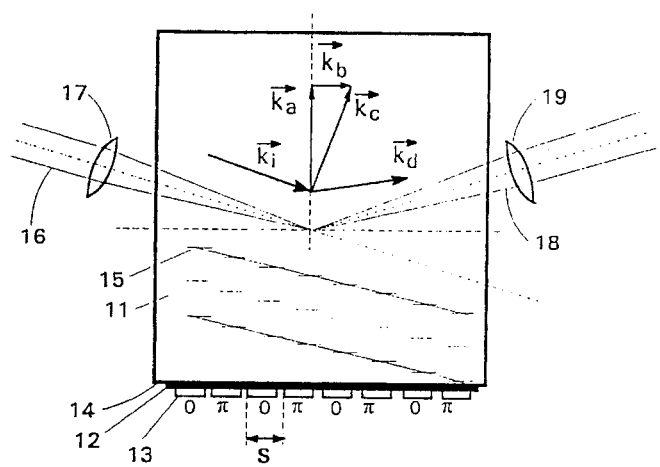
FIG. 1 is a schematic representation of a preferred embodiment of an AO modulator in accordance with the present invention.

Referring to FIG. 1, therein is shown, diagramatically, an AO modulator in accordance with the present invention. The Bragg cell comprises a suitable AO medium 11 made of an optically birefringent crystal. A planar acoustic array 12 comprising a number of transducer elements 13 is mounted in intimate contact with the medium 11 on a common planar surface 14. The individual transducer 13 launches an acoustic wave 15 along the acoustic wavevector direction $\vec{k}_a$. The magnitude of $\vec{k}_a$ is equal to $2\pi/\Lambda_a$, where $\Lambda_a$ is the acoustic wavelength. The acoustic transducers 13 are connected to a suitable radio frequency (RF) signal source (not shown) such as a voltage controlled oscillator, the frequency and amplitude of which can be varied. RF signals are applied to the acoustic array 12 such that the phase difference of adjacent transducer elements 13 are 180°. The transducer array with alternative 0° and 180° phases forms a phase grating along the array vector $\vec{k}_b$ which is normal to the acoustic wavevector $\vec{k}_a$. The magnitude of $\vec{k}_b$ is equal to $2\pi/\Lambda_b$, where $\Lambda_b$ is the array wavelength and is equal to twice the spacing between adjacent elements of the transducer array. When the acoustic waves from all of the acoustic phase array transducers are combined, the composite acoustic wave is then represented by a wavevector $\vec{k}_c$ which is equal to the vector sum of the single element acoustic wavevector $\vec{k}_a$ and the phased array vector $\vec{k}_b$. Efficient light diffraction by the composite acoustic wave occurs when the momentum matching condition is satisfied $$\vec{k}_d = \vec{k}_i + \vec{k}_c = \vec{k}_i + \vec{k}_a + \vec{k}_b \tag{1}$$

where $\vec{k}_i$ and $\vec{k}_d$ are the wavevectors for the incident and diffracted light, respectively. For the AO modulator in accordance with the present invention, the magnitude and direction of the composite wavevector $\vec{k}_c$ is chosen so that the tangent to the incident and diffracted optical wavevector loci are parallel. The AO diffraction then becomes relatively insensitive to the direction of the incident light, a condition known as Noncritical Phase Matching (NPM). An incident laser beam 16 is focused by input lens 17 onto the medium 11. When the noncritical phase matching (NPM) condition is satisfied for the composite acoustic wave, part of the incident light beam is diffracted into the orthogonal polarization. The diffracted optical beam 18 exits the medium 11, is spatially separated from the incident light beam 16 and is recollimated by the output lens 19.

The AO modulator described above is based on the birefringent diffraction from phased array acoustic waves. To understand the principle of operation, a brief review on the subject of AO diffraction is given below.

In an optically isotropic medium, there is a single index of refraction independent of polarization and direction of the optical wave. The locus of the refractive index is a circle. AO diffraction occurs between diffracted and incident light of the same refractive index. This is referred to as isotropic diffraction. The AO diffraction in an optically birefringent crystal can be quite different. Depending on the polarization of the optical wave, there are two refractive indices, $n_o$ and $n_e$ for the ordinary polarized wave (o-wave) and the extraordinary polarized wave (e-wave), respectively. Notice that $n_o$ is a constant and $n_e$ is a function of the light propagation direction. For instance, in a uniaxial crystal, the loci of the $n_o$ and $n_e$ for a light beam propagating in the XZ plane are a circle and an ellipse, respectively. In a birefringent crystal, AO diffraction can occur between light waves of the same polarization, i.e., the same isotropic diffraction as that which occurs in an isotropic medium. However, there also exists an abnormal AO diffraction that occurs between two different loci of a refractive index which is called birefringent diffraction. The unique characteristics of birefringent diffraction have been utilized to improve the performance of AO devices.

Figure 2A:
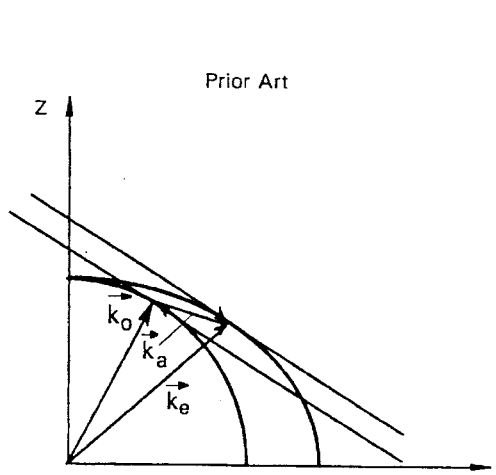
FIGS. 2a and 2b show wavevector diagrams for prior art AO birefringent Bragg cells using a single transducer.

A powerful approach for analyzing the characteristics of AO diffraction is the use of wavevector diagrams. As an example, the prior art single transducer AO devices operating at NPM condition are described by using the wavevector diagrams. FIG. 2a shows the wavevector diagram for NPM type AO interaction in a birefringent crystal. Efficient AO diffraction occurs when the momentum matching condition is satisfied $$\vec{k}_d = \vec{k}_i + \vec{k}_a \tag{2}$$

Referring to FIG. 2a, the acoustic wavevector $\vec{k}_a$ is chosen so that the tangents to the loci of the optical wavevectors, $\vec{k}_i$ and $\vec{k}_d$, are parallel. Inspection of FIG. 2a shows that as the direction of the incident wavevector $\vec{k}_i$ is changed, the momentum matching triangle is approximately maintained. Thus, by satisfying the NPM condition, the AO device achieves a large angular aperture. Another example of utilizing birefringent diffraction is the wideband AO deflector operating at tangential phase matching (TPM).

Figure 2B:
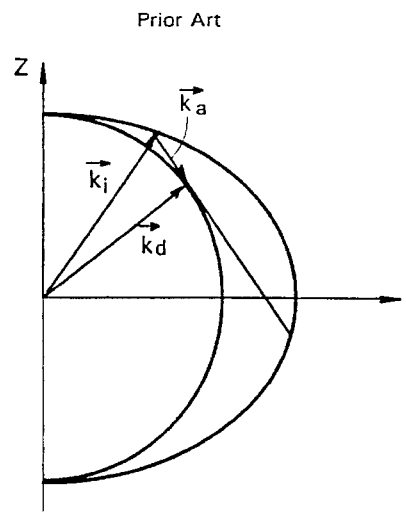

Refer to FIG. 2b, which shows the wavevector diagram of the prior art birefringent Bragg cell operated at TPM condition. The acoustic wavevector is chosen to be nearly tangential to the locus of the diffracted optical wavevector. The Bragg cell thus realizes a large bandwidth by operating at the TPM condition.

Notice that from FIG. 2a, the acoustic wavevector connects the two points of parallel tangents, it cannot be also tangential to the locus of the diffracted light wavevector. It is obvious that the prior art AO device cannot simultaneously satisfy both NPM and TPM conditions and thus exhibits limited modulation bandwidth. This basic discrepancy is overcome with the AO device in accordance with the present invention.

Figure 3:
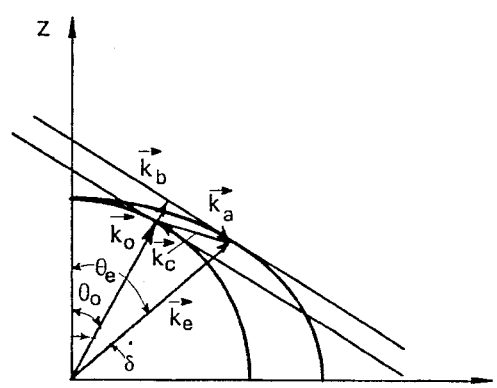
FIG. 3 shows the wavevector diagram of a wideband AO modulator with large angular aperture in accordance with the present invention.

Refer to FIG. 3 which shows the wavevector diagrams for the preferred embodiment of the phased array Bragg cell as shown in FIG. 1. The acoustic wavevector $\vec{k}_a$ and the phased array of the resultant wavevector $\vec{k}_c$ are chosen so that $\vec{k}_a$ is tangential to the diffracted optical wavevector locus and the tangents to the incident and diffracted optical wavevector locus are parallel. With this choice of interaction geometry, the AO Bragg cell simultaneously satisfies the TPM and NPM conditions and is able to achieve a wide RF bandwidth and an input angular aperture, and consequently a large modulation bandwidth.

The wavevector diagram completely determines the functional relationship of the key parameters of the AO device of the present invention. As an illustrative example, the following design equations for the wide angle AO modulator are obtained. It is convenient to define the magnitude of wavevectors in terms of equivalent refraction indices;

$$k_o = \frac{2\pi n_o}{\lambda_o}, \; k_e = \frac{2\pi n_e}{\lambda_o}, \; k_a = \frac{2\pi n_a}{\lambda_o}, \; k_b = \frac{2\pi n_b}{\lambda_o} \tag{3}$$

where $n_a = \lambda_o f/V$ and $n_b = \lambda_o/2s$. $\lambda_o$ is the optical wavelength, f and V are the frequency and velocity of the acoustic waves, and s is the interelectrode spacing of the phased array. The refractive index $n_e(\theta_e)$ of the e-wave is a function of the polar angle $\theta_e$. For a uniaxial crystal $n_e(\theta_e)$ is given by $$n_e(\theta_e) = \left( \frac{\cos^2\theta_e}{n_o^2} + \frac{\sin^2\theta_e}{n_z^2} \right)^{-1/2} \tag{4}$$

Referring to the wavevector diagram in FIG. 3, when both the NPM and TPM conditions are met, the acoustic wavevector $\vec{k}_o$ is perpendicular to the ordinary wavevector ($\theta_a = \theta_o \pm 90°$). Thus, the following relations hold for both o-wave and e-wave modes.

$$n_a = n_e \sin \delta \tag{5}$$

$$n_b = n_e \cos \delta - n_o \tag{6}$$

where $$\delta = \theta_e - \theta_o \tag{7}$$

is the angle between the incident and diffracted optical wave. At NPM, $\theta_o$ and $\theta_e$ are related by $$\tan\theta_e = \left( \frac{n_z}{n_o} \right)^2 \tan\theta_o \tag{8}$$

By selecting $\theta_o$ (or $\theta_e$), Eqs. 4–8 can be solved to determine the operating parameters of the wide angle AO modulator. For most practical cases the fractional birefringence is small, $\Delta n \ll n_o$, and the following approximate solutions for center frequency $f_o$ and array spacing s are obtained:

$$f_o = \frac{V\Delta n}{\lambda_o} \sin 2\theta \tag{9}$$

$$s = \frac{\lambda_o}{2\Delta n \sin^2\theta} \tag{10}$$

where $\theta$ is the geometric mean of $\theta_o$ and $\theta_e$. For a chosen AO material and a selection of angle $\theta$, Eqs. (9) and (10) provide the design parameters $f_o$ and s for the AO modulator of the present invention.

It is instructive to design a wide angle AO modulator based on the proposed method. Consider a $TeO_2$ cell using a [110] polarized shear mode propagating at 105° from the c-axis. Assume the modulator is operated at 633 nm with a 50 percent fractional bandwidth, the performance parameters of the AO modulator are calculated and given in Table I.

TABLE I

| Parameters of Wide Angle AO Modulator | |
| --- | --- |
| Optical Wavelength | 633 nm |
| Center Frequency | 100 MHz |
| Bandwidth | 50 MHz |
| Deflection Angle (from incident light) | 4.5° |
| Deflected Light Angular Bandwidth | 2.25° |
| Element Spacing | 30 μm |
| Number of Elements | 110 |
| Angular Aperture | 6.9° |

The angular aperture is more than one order of magnitude larger than that which is obtainable with conventional design (about 0.3°).

The large angular aperture wideband AO modulator also provides a preferred embodiment for the construction of a wideband AO frequency shifter. When a laser beam is diffracted in an AO Bragg cell, the optical frequency of the diffracted light is shifted upward (or downward) by the applied acoustic frequency. This phenomena has been the basis of the acousto-optic frequency shifter (AOFS), a device that is used in optical interferometry. One serious problem of the AOFS is that associated with the frequency shift, there is also a deflection angle. One technique to overcome this problem is to use an incident light beam divergence larger than the angle of deflection. Similar to the case of the AO modulator, the AO Bragg cell of the present invention avoids reduction of diffraction efficiency due to the small angular aperture of the prior art AO Bragg cell.

Figure 4:
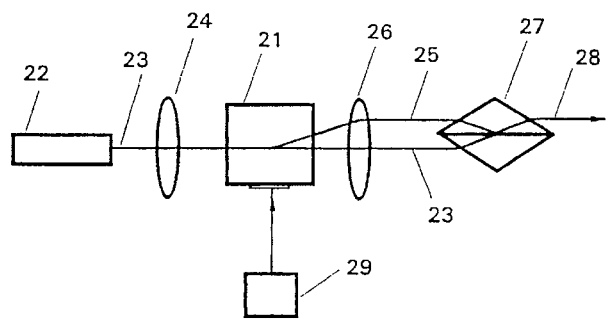
FIG. 4 is a schematic representation of a two frequency laser source using the wide angle AO modulator of the present invention.

Due to the large angular aperture of the AO modulator, a number of optical signal processing devices or systems can be built with simpler construction. Some of the examples include correlators, convolvers and spectrum analyzers. In the following example it is shown that by using the wide angle modulator of the present invention, a two frequency laser source can be made with significantly large bandwidth and less optical elements than what has been previously possible. Referring to FIG. 4, which shows a preferred embodiment of a two frequency laser in accordance with the present invention. The device comprises a wide angle AO modulator 21 in accordance with the present invention, a single frequency laser 22 and appropriate optics. An optical beam 23 from the laser source 22 is focused by the input lens 24 into the AO modulator 21 and is diffracted into orthogonal polarization. Both the incident beam 23 and the diffracted beam 25 with orthogonal polarization are collimated by the output lens 26 and are combined by the polarization beamsplitter 27 into a single beam 28. The modulator 12 is driven by an RF signal source 29, the frequency and amplitude of which can be varied. By driving the modulator with multiple signals, a programmable optical frequency synthesizer can be constructed.

Figure 5:
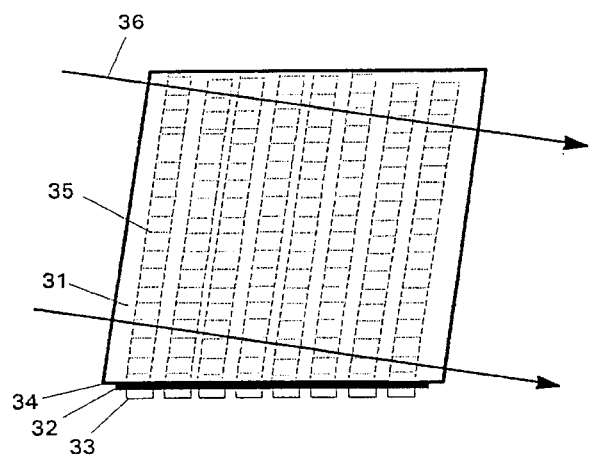
FIG. 5 is a schematic representation of another preferred embodiment of the AO modulator in accordance with the present invention.

With reference to FIG. 5, therein is shown a schematic of a preferred configuration of the AO Bragg cell with which wide bandwidth and large number of resolvable spots are attainable. The AO Bragg cell comprises a suitable AO medium 31, a planar acoustic array 32 with a number of acoustic transducer elements 33 is mounted in intimate contact with the medium 31 on a common planar surface 34. The individual transducer elements 33 launches an acoustic wave 35 along the acoustic wavevector $\vec{k}_a$. The acoustic energy flow direction (along the acoustic group velocity $\vec{V}_g$ vector) is generally different from the acoustic wave normal, which is along the direction of the acoustic wavevector $\vec{k}_a$.

An incident optical beam 36 enters the medium 31 and propagates along a predetermined optical path. RF signals are applied to the acoustic array 32 so that the phase difference of adjacent transducers are 180°. The transducer array forms a phase grating along the array vector $\vec{k}_b$. The acoustic wavevector $\vec{k}_a$ is chosen in such a manner that the resulting wavevector $\vec{k}_c$ is tangential to the locus of the diffracted light wavevector and corresponding energy flow direction (along the group velocity direction $\vec{V}_g$) is perpendicular to the direction of the optical beam 36. With this choice of interaction, the AO deflector can realize a wide bandwidth by satisfying the TPM condition and also a large time aperture since the acoustic energy flow is normal to the direction of the optical beam.

As shown in FIG. 5, in a transverse configuration the acoustic group velocity and incident optical beam are perpendicular. This feature allows the extension of the optical aperture and overcome the time aperture limitation due to acoustic walkoff. It is not necessary to implement this configuration using phased array transducers. However, the use of phased array transducers provides an additional degree of freedom in the design of large resolution Bragg cells.

In the above description of the preferred embodiment of AO Bragg cells, for sake of discussion, a planar phased array transducer configuration is used. More generally, blazed acoustic phased array can be used as well for more efficient use of acoustic power.

Figure 6:
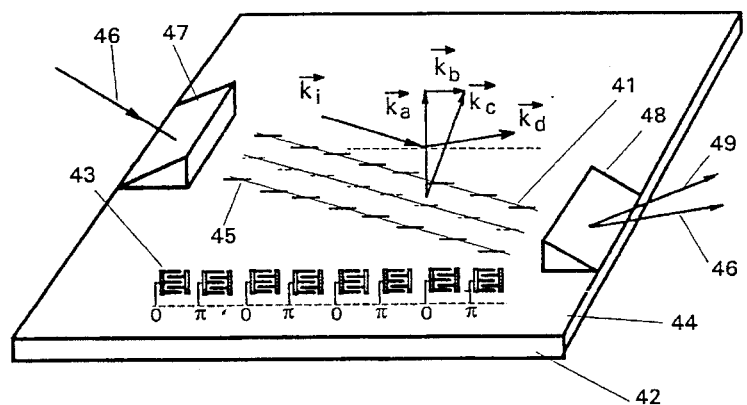
FIG. 6 is the schematic representation of an integrated optic modulator in accordance with the present invention.

The concept of the improved AO Bragg cell described above is directly applicable to integrated optic implementation based on the interaction of surface acoustic waves (SAWs) and optical guided waves. FIG. 6 is a schematic representation of an integrated AO Bragg cell according to the present invention.

The integrated acousto-optic Bragg cell comprises an optical waveguide 41 formed on the surface of an optically birefringent crystal substrate 42 such as LiNbO$_3$, a stepped phased array of interdigital transducers (IDTs) 43 are deposited on the top face 44 of the crystal substrate 42, the individual transducer element launches an acoustic wave 45 along the acoustic wavevector $\vec{k}_a$. The relative phase spacing and step size of adjacent transducer elements in the stepped acoustical array are properly chosen to form a blazed phase grating along the array vector $\vec{k}_a$. The acoustic waves from all elements of the phased array interfere constructively to form a spatially modulated acoustic wave with a resultant wavevector $\vec{k}_c$ which is equal to the vector sum of the single element acoustic wavevector $\vec{k}_a$ and the phased array vector $\vec{k}_b$. An incident light 46 is coupled into the optical waveguide 41 by the input prism 47, propagates in the substrate 42 and is diffracted by the surface acoustic wave into the orthogonal polarization, coupled out of the substrate 42 by the output prism coupler 48 and exits as the diffracted optical beam 49. The magnitude and direction of the resultant wavevector $\vec{k}_c$ of the spatially modulated acoustic wave is chosen so that the tangents to the loci of incident and diffracted light are parallel. In addition the acoustic wavevector $\vec{k}_a$ is chosen to be nearly tangential to the locus of the diffracted light. Since both the NPM and TPM conditions are simultaneously satisfied, the preferred embodiment of the SAW Bragg cell is able to achieve large modulation bandwidth. The basic concept of the wideband SAW type of modulator is essentially identical to its bulk wave counterparts. In the integrated type of AO Bragg cell, however, it is much simpler to construct the stepped phased array.

A number of efficient AO materials are suitable interaction medium for the AO Bragg cell of the present invention. These materials include TeO$_2$, LiNbO$_3$, Hg$_2$Cl$_2$, Hg$_2$Br$_2$, TiO$_2$ and crystal quartz.

What is claimed is:

1. An acousto-optic modulator for diffracting an incident light beam having an incident wavevector k$_i$ and a first polarization to a diffracted light beam having a diffracted wavevector k$_d$ and a second polarization that is orthogonal to the first polarization, said modulator comprising:

a) an optically birefringent medium;

b) means for focusing and passing said incident light beam through said optically birefringent medium; and c) an acoustical phased array comprising a plurality of acoustic transducers where each of said transducers excites an acoustic wave with a wave vector k$_a$, said plurality of transducers having proper relative phases forms a phased array with an array vector k$_b$, and superposition of all the acoustic waves from said phased array generates a spatially modulated acoustic wave with a resultant wave vector k$_c$ being equal to the vector sum of said acoustic wave vectors k$_a$ and array vector k$_b$, and where the direction of said resultant wave vector k$_c$ is selected such that the tangents to the locus of the incident wave vector $k_i$ and the locus of the diffracted wave vector $k_d$ are substantially parallel.

2. The acousto-optic modulator of claim 1 further comprising means for selecting the direction of said acoustic waves such that said acoustic wave vector $k_a$ is substantially tangential to the locus of the diffracted wave vector $k_d$.

3. The acousto-optic modulator of claim 1 further comprising means for collimating and combining said incident light beam and said diffracted light beam into a single light beam with two different optical frequencies and orthogonal polarizations.

4. The acousto-optic modulator of claim 1 wherein said plurality of acoustic transducers being arranged in a planar array of transducers coupled to said optically birefringent medium, and a means for applying high frequency signals to the transducers, the phase difference between adjacent transducers is 180°.

5. The acousto-optic modulator of claim 1 wherein said plurality of acoustic transducers being arranged in a stepped transducer array blazed at proper angle for exciting a single spatially-modulated acoustic wave.

6. An acousto-optic deflector for diffracting an incident light beam having an incident wave vector $k_i$ to a diffracted light beam having a diffracted wave vector $k_d$, said acousto-optic deflector comprising:

a) an acoustically anisotropic medium in which the directions of the acoustic phase velocity and group velocity are generally different;

b) a means for collimating and passing said incident light beam along a selected axis through said acoustically anisotropic medium; and c) an acoustical phased array comprising a plurality of acoustic transducers where each of said transducers excites an acoustic wave with a wave vector $k_a$, said plurality of transducers having proper relative phases forms a phased array with an array vector $k_b$, and superposition of all the acoustic waves from said phased array generates a spatially modulated acoustic wave with a resultant wavevector $k_c$ being equal to the vector sum of said acoustic wavevectors $k_a$ and said array vector $k_b$, and where the direction of said acoustic waves are selected such that the direction of the acoustic group velocity $V_g$ of said acoustic waves is substantially perpendicular to said axis of incident light.

7. The acousto-optic deflector of claim 6 further comprising means for selecting the direction of said acoustic waves such that said acoustic wave vector $k_a$ is substantially tangential to the locus of the diffracted wave vector $k_d$.

8. The acousto-optic deflector of claim 6 wherein said acoustically anisotropic medium comprises an optically birefringent crystal and the polarization of said diffracted light beam is orthogonal to the polarization of said incident light beam.

9. An integrated acousto-optic modulator for diffracting an incident light beam having an incident wave vector $k_i$ and a first polarization to a diffracted light beam having a diffracted wave vector $k_d$ and a second polarization that is orthogonal to the first polarization, said integrated acousto-optic modulator comprising:

a) an optical waveguide formed on the surface of an optically birefringent crystal substrate;

b) a means for coupling said incident light beam into said optical waveguide such that said incident light beam travels through said waveguide; and c) an acoustical phased array comprising a plurality of inter-digital transducers where each of said transducers excites a surface acoustic wave with a wave vector $k_a$, said plurality of inter-digital transducers having proper relative phases forms a phased array with an array vector $k_b$, and superposition of all the surface acoustic waves from said phased array generates a spatially modulated surface acoustic wave with a resultant wavevector $k_c$ being equal to the vector sum of said acoustic wave vectors $k_a$ and said array vector $k_b$, and where the direction of said resultant wave vector $k_c$ is selected such that the tangents to the locus of the incident wave vector $k_i$ and the locus of the diffracted wave vector $k_d$ are substantially parallel.

10. The integrated acousto-optic modulator of claim 9 further comprising means for selecting the direction of said surface acoustic waves such that said acoustic wave vector $k_a$ is substantially tangential to the locus of the diffracted wave vector $k_d$.

11. The integrated acousto-optic modulator of claim 9 wherein said plurality of inter-digital transducers being arranged in a stepped array of inter-digital transducers blazed at the proper angle for exciting a single spatially-modulated surface acoustic wave.

* * * * *